H. M. DUDLEY.
DYEING MACHINE.
APPLICATION FILED MAR. 6, 1918.
1,338,218.
Patented Apr. 27, 1920.
9 SHEETS—SHEET 1.
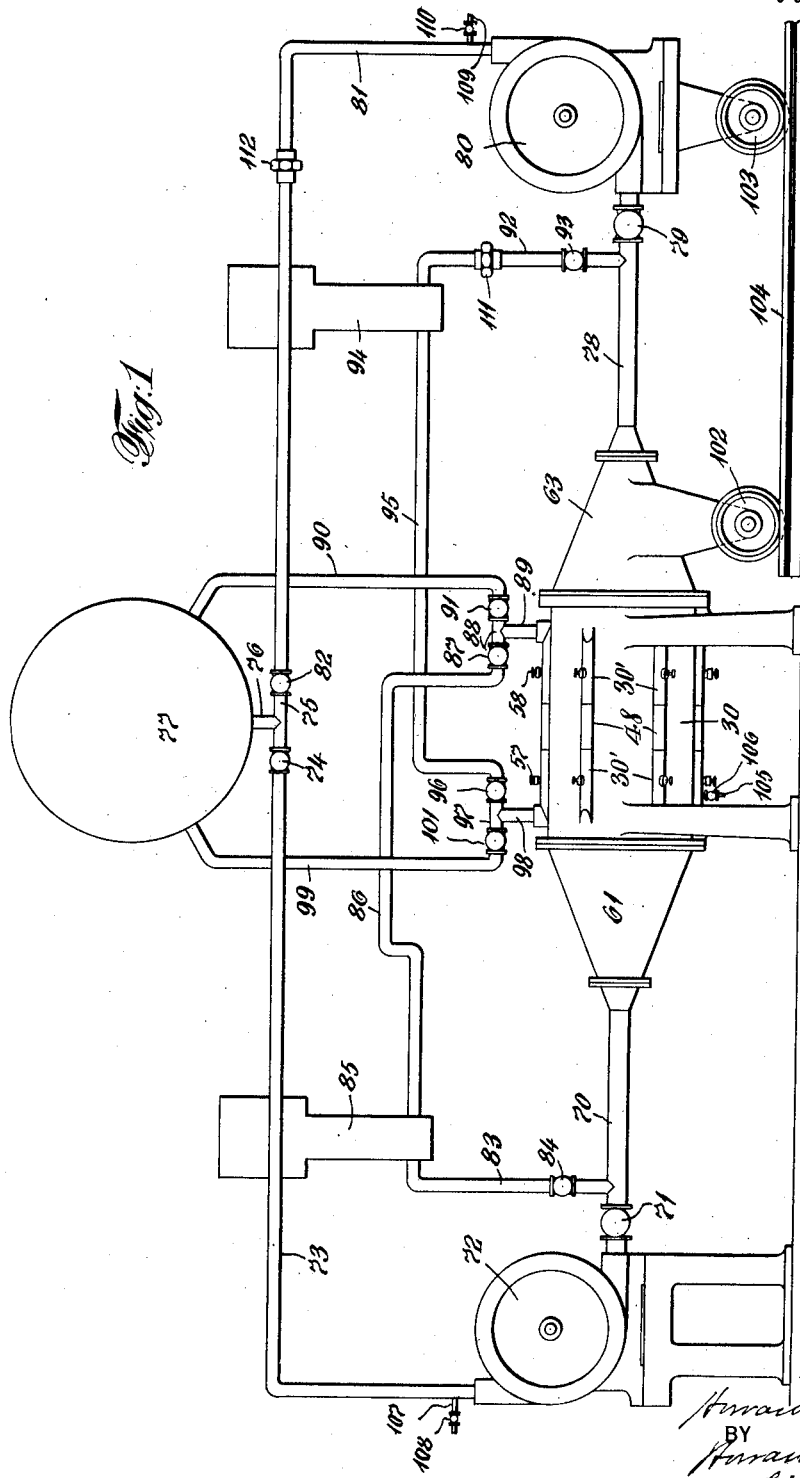
INVENTOR
Howard M. Dudley
BY
Horace Sherman
his ATTORNEY H. M. DUDLEY.
DYEING MACHINE.
APPLICATION FILED MAR. 6, 1918.
1,338,218.
Patented Apr. 27, 1920.
9 SHEETS—SHEET 2.
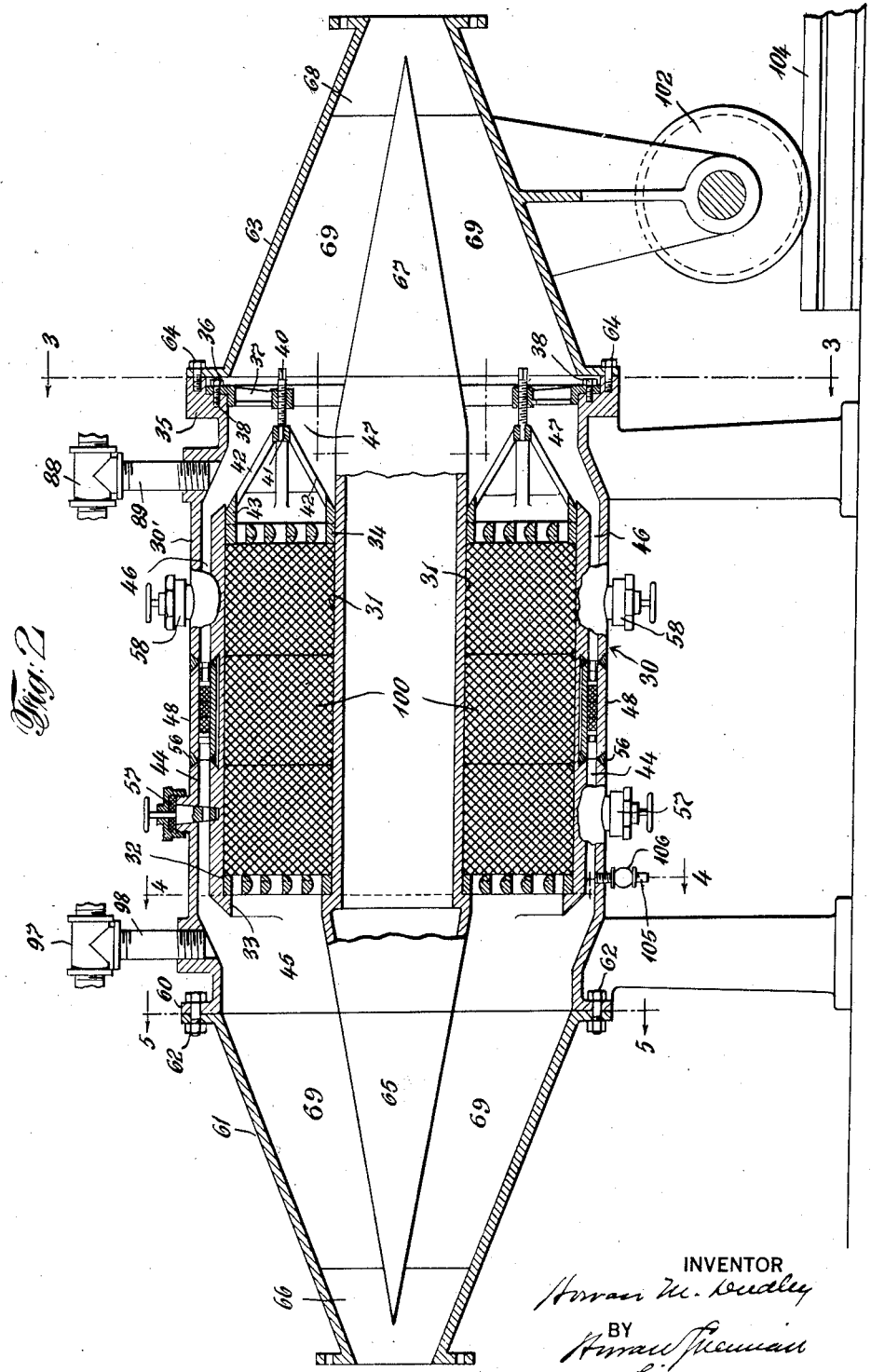
INVENTOR
Horace M. Dudley
BY
ATTORNEY

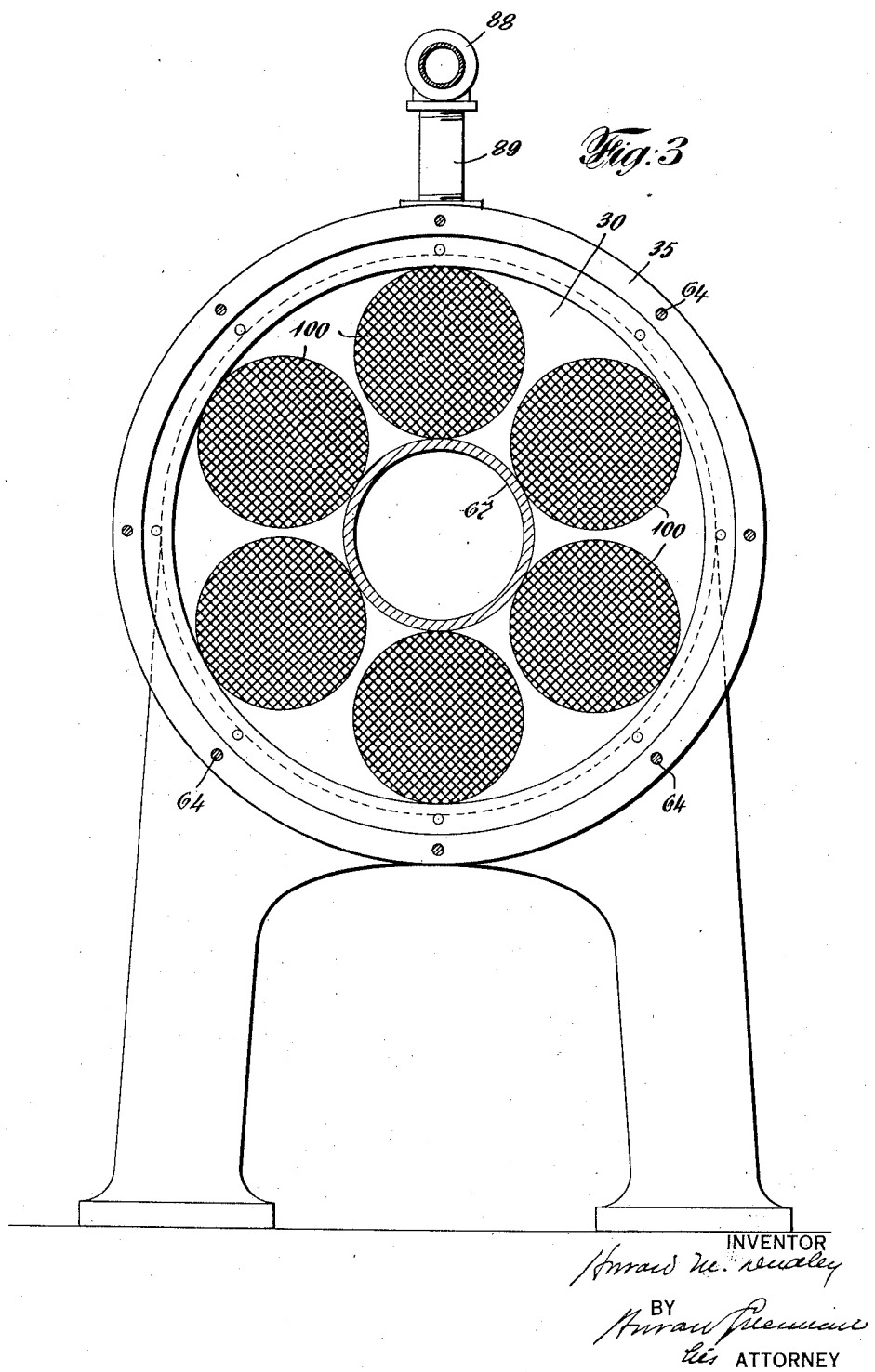

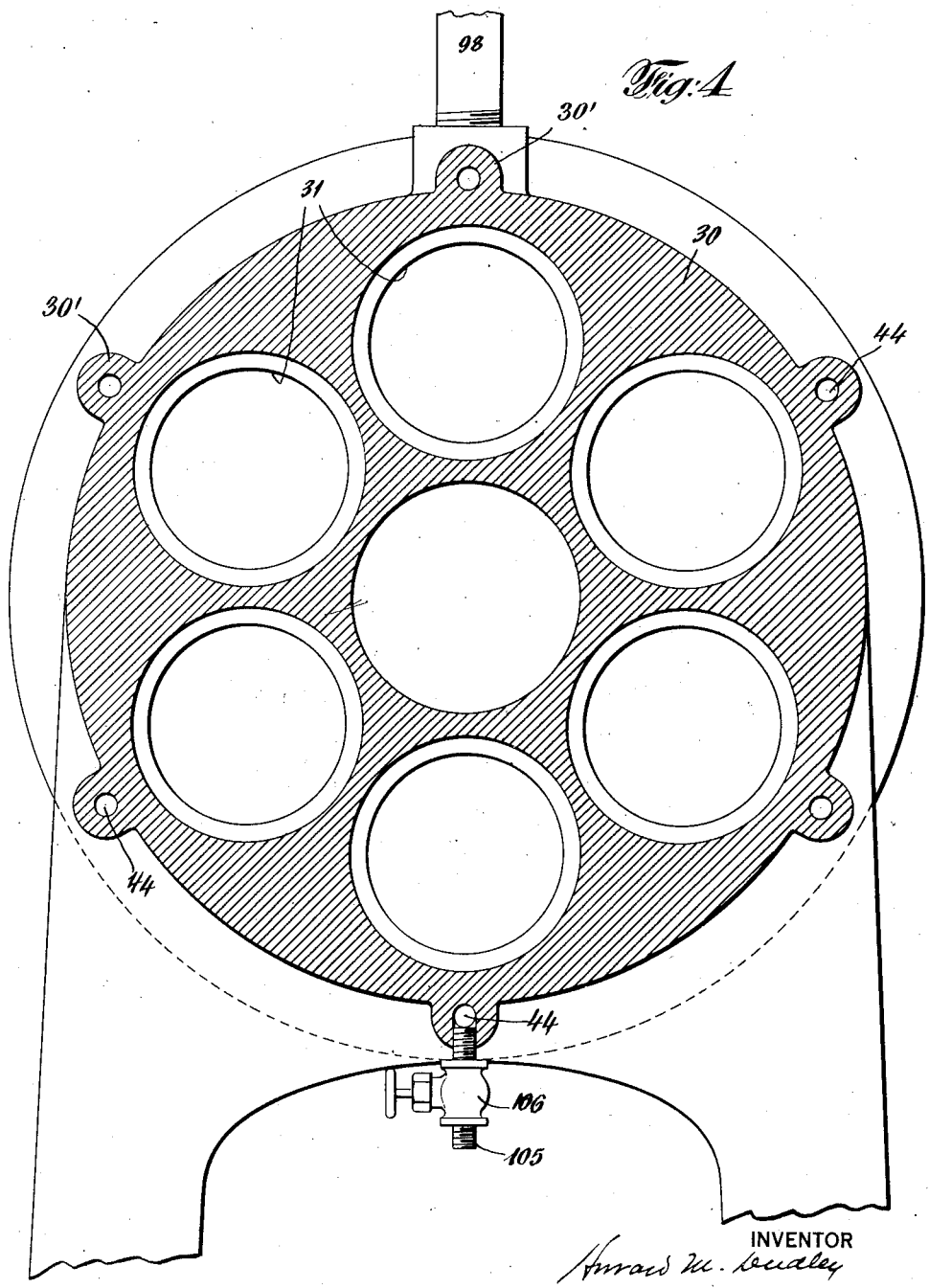

H. M. DUDLEY.
DYEING MACHINE.
APPLICATION FILED MAR. 6, 1918.
1,338,218.
Patented Apr. 27, 1920.
9 SHEETS—SHEET 5.
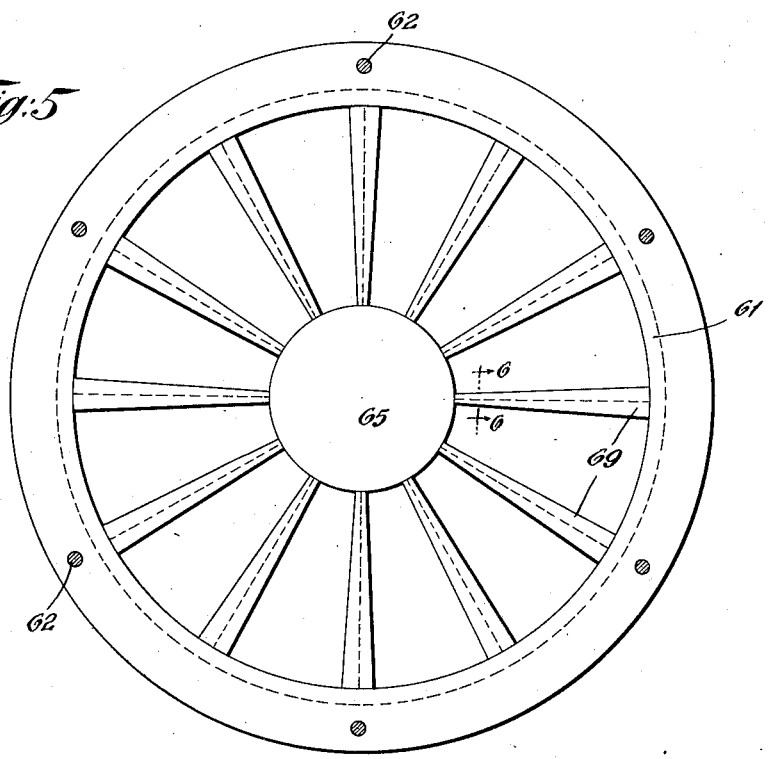
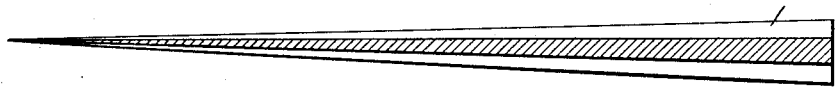
INVENTOR
BY
ATTORNEY H. M. DUDLEY.
DYEING MACHINE.
APPLICATION FILED MAR. 6, 1918.
1,338,218.
Patented Apr. 27, 1920.
9 SHEETS—SHEET 6.
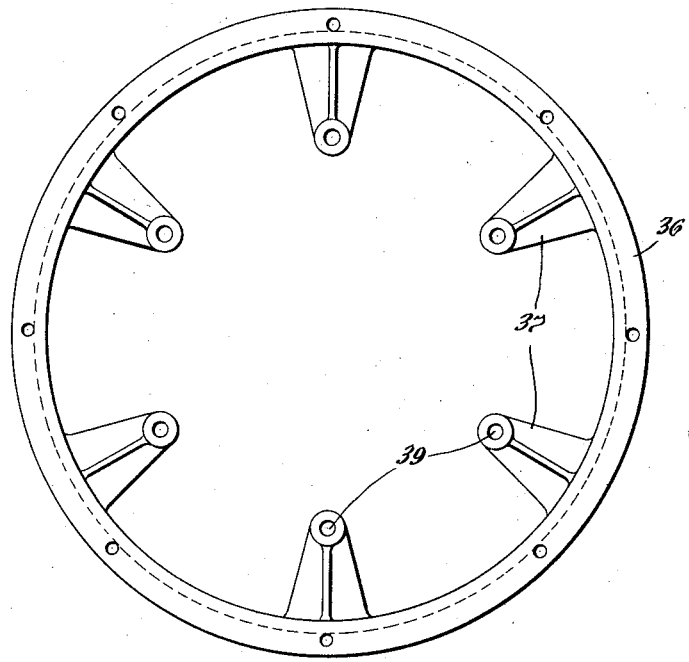
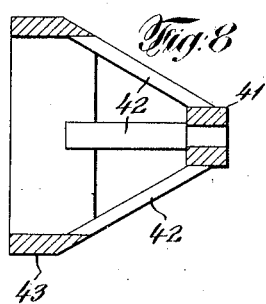
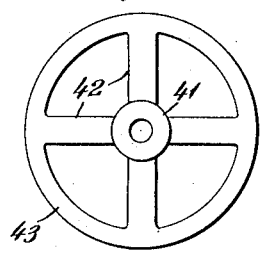
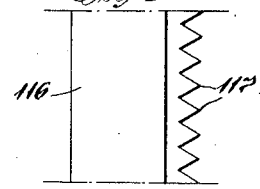
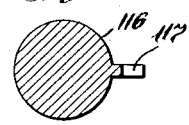
INVENTOR
Howard M. Dudley
BY
Howard Freeman
his ATTORNEY H. M. DUDLEY.
DYEING MACHINE.
APPLICATION FILED MAR. 6, 1918.
1,338,218.
Patented Apr. 27, 1920.
9 SHEETS—SHEET 7.
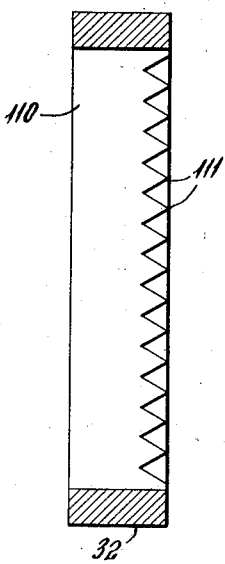
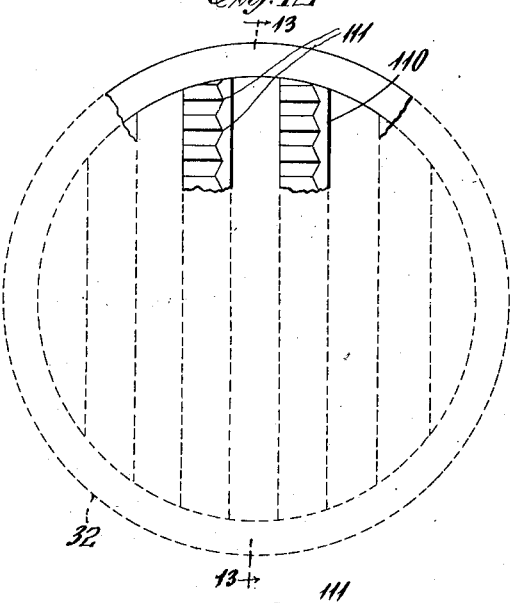
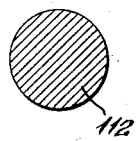
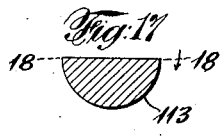
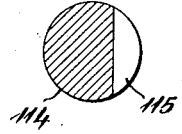
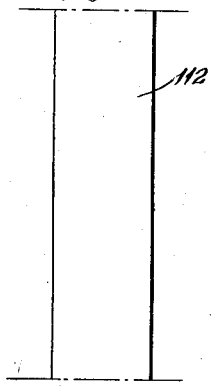
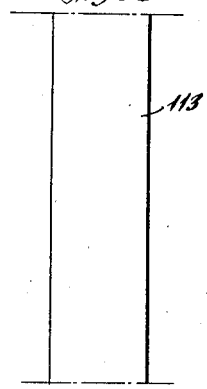
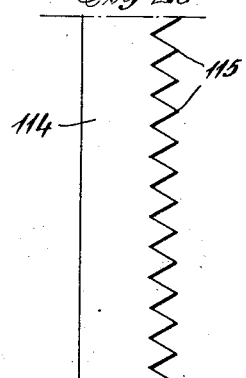
INVENTOR
BY
ATTORNEY H. M. DUDLEY.
DYEING MACHINE.
APPLICATION FILED MAR. 6, 1918.
1,338,218.
Patented Apr. 27, 1920.
9 SHEETS—SHEET 8.
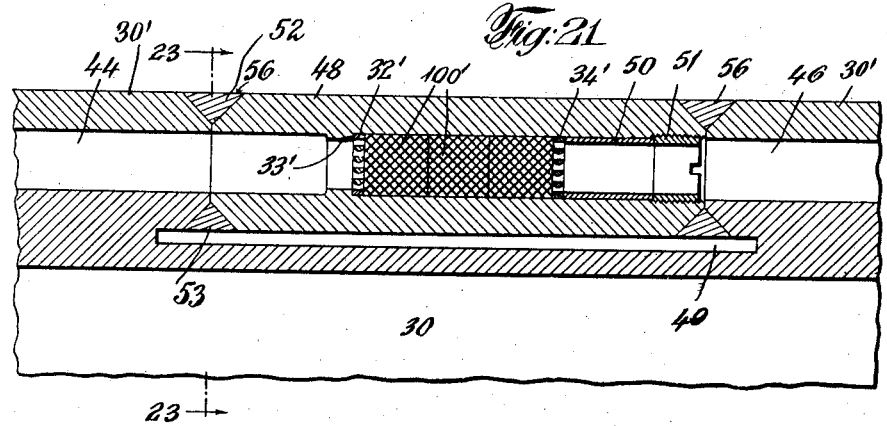
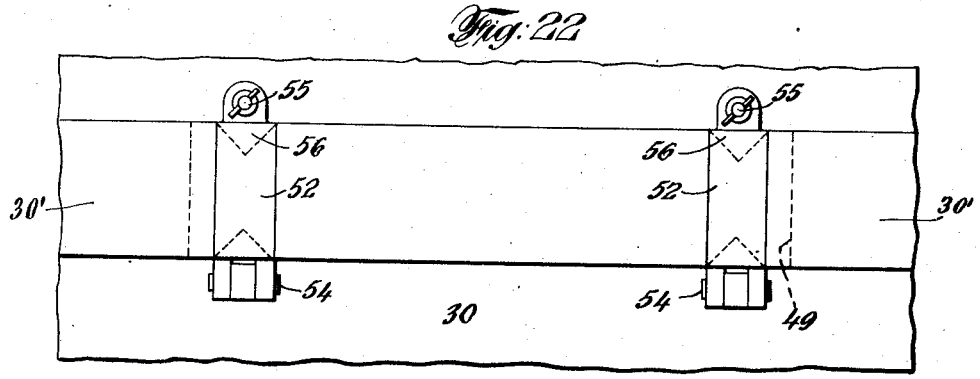
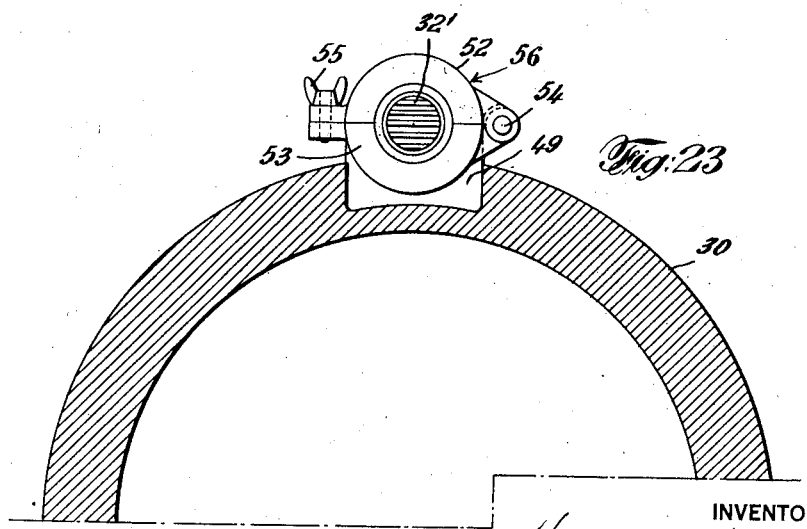
INVENTOR
BY
ATTORNEY H. M. DUDLEY.
DYEING MACHINE.
APPLICATION FILED MAR. 6, 1918.
1,338,218.
Patented Apr. 27, 1920.
9 SHEETS—SHEET 9.
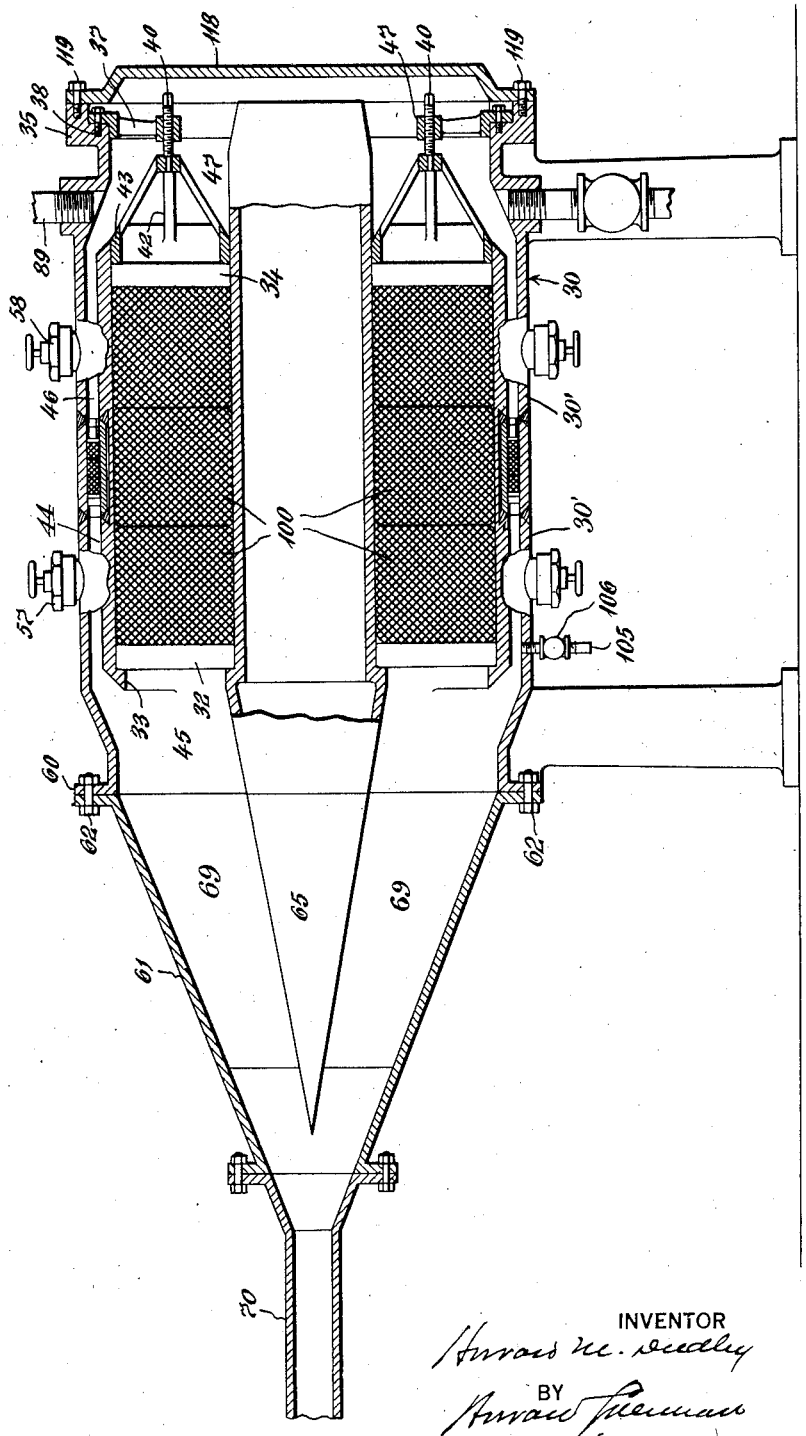
INVENTOR
BY
ATTORNEY

UNITED STATES PATENT OFFICE.

HOWARD M. DUDLEY, OF PHILADELPHIA, PENNSYLVANIA.

DYEING-MACHINE.

1,338,218.   Specification of Letters Patent.   Patented Apr. 27, 1920.

Application filed March 6, 1918. Serial No. 220,850.

*To all whom it may concern:*

Be it known that I, HOWARD M. DUDLEY, a citizen of the United States, residing in the city of Philadelphia, county of Philadelphia, and State of Pennsylvania, have invented certain new and useful Improvements in Dyeing-Machines, of which the following is a full, clear, and exact specification.

My invention relates to dyeing machines and refers particularly to those machines in which textile fibers in the form of warp balls, or similar forms, are dyed while in a compressed condition.

The dyeing of fibers under these conditions presents many difficulties, as it is essential that all parts of the fiber mass be treated absolutely equally by the dye liquid, as otherwise uneven results will be obtained.

This equal treatment is dependent upon a number of conditions; the fiber must be uniformly and properly compressed, the liquid must be at a uniform pressure throughout the fiber mass, the formation of channels or passages within the fiber mass must be avoided, the dye liquid must be of such dilution as to prevent precipitation upon the fiber, the temperature of the liquid must be properly retained and means must be employed for determining the condition of the dyed fibers without interrupting the dyeing operation, opening the dyeing chamber or disturbing or sampling the fiber being dyed.

I have found that valuable commercial results are obtained when the fiber is compressed and then has a dye liquid forced through it in one direction and drawn through it in the reverse direction. The results thus obtained are more uniform than those obtained by forcing the liquid through the fiber in the two directions, as the drawing of the liquid causes a more or less rearrangement of the passages through which the liquid passes, and hence, those portions of the fiber which may not be properly dyed when the liquid passes in one direction, will receive proper treatment when the liquid passes through in the reverse direction.

The process of alternately forcing and drawing a dye liquid through a compressed fiber mass therefore produces more valuable results than can be produced where the liquid is forced through the mass in both directions.

The device of my invention accomplishes all of the above results in a manner economical in construction and cheap, simple, accurate and positive in operation, and possesses, therefore, advantages which will be evident upon a consideration of my specification, drawings and claims.

The device of my invention, in a broad way, comprises a series of fiber chambers within which, fiber masses can be compressed and a dye liquid forced in one direction therethrough, and drawn therethrough, in the reverse direction, all parts of the fiber being treated evenly and uniformly.

It also comprises a means whereby the condition of the fiber may be accurately judged at any time without interrupting the dyeing operation.

In the several modifications of the device of my invention, shown in the accompanying drawings, similar parts are designated by similar numerals.

Figure 1 is a diagrammatic view of my device, partly in elevation and partly in plan.

Fig. 2 is a vertical section of the dyeing mechanism.

Fig. 3 is a section through the line 3—3 of Fig. 2 with the spiders and their retaining means removed.

Fig. 4 is a section through the line 4—4 of Fig. 2.

Fig. 5 is a section through the line 5—5 of Fig. 2.

Fig. 6 is a section on the line 6—6 of Fig. 5.

Fig. 7 is a plan view of the spider retaining means.

Fig. 8 is a vertical section of one of the spiders.

Fig. 9 is an end view of Fig. 8.

Fig. 10 is an end view of a modification of the bars in the foraminous plate.

Fig. 11 is an elevation of Fig. 10.

Fig. 12 is a broken plan view, partly in section, of the foraminous plate of Fig. 2.

Fig. 13 is a section through the line 13—13 of Fig. 12.

Fig. 14 is an end view of one of the bars of Fig. 12.

Fig. 15 is an end view of a modified bar of the foraminous plate.

Fig. 16 is an elevation of Fig. 15.

Fig. 17 is an end view of a modified bar of the foraminous plate.

Fig. 18 is a section through the line 18—18 of Fig. 17.

Fig. 19 is an end view of a modified bar of the foraminous plate.

Fig. 20 is an elevation of Fig. 19.

Fig. 21 is an enlarged cross-section of the testing device.

Fig. 22 is a top plan view of Fig. 21.

Fig. 23 is a section through the line 23—23 of Fig. 21.

Fig. 24 is a vertical section of a modified form of the dyeing chambers and operative parts.

The particular form of my device, shown in the accompanying drawings, comprises a body member 30 having a series of dyeing chambers 31, 31 and extended members 30′, 30′. A foraminous plate 32 is capable of placement within each dyeing chamber 31 and of abutment upon the annular shoulder 33 extending inwardly of the dyeing chamber. A similar plate 34 is slidable within each dyeing chamber and capable of abutment upon the inner walls thereof. One end of the body 30 is extended into the outwardly extended annular stepped flange member 35. An annular member 36, carrying the inwardly extended arms 37, 37 is attached to one of the steps of the member 35 by the bolts 38, 38. Each arm 37 carries a threaded hole 39 situated centrally over a dyeing chamber 31. A threaded bolt 40 threads within each hole 39, the interior end of the bolt 40 being capable of abutment upon a spider member 41, the lower ends of the legs 42, 42 being connected by an annular member 43 capable of abutment upon the foraminous plate 34.

Within the body 30, is a series of conduits 44, 44, each one being parallel to a dyeing chamber 31 and opening into a chamber 45. Within the body 30 is a second series of conduits 46, 46, each one being parallel to a dyeing chamber 31 in alinement with a conduit 44 and opening into a chamber 47. The ends of the walls of the conduits 44 and 46 are beveled. A tubular testing member 48 of the same interior and exterior diameter as the conduits 44 and 46, having beveled ends, is capable of abutment between the conduits 44 and 46. There is a recess 49 in the body 30 beneath the tubular member 48. Within the testing member 48 is a foraminous plate 32′ capable of abutment upon the annular shoulder 33′. A second foraminous plate 34′ is slidable within the testing member and capable of abutment upon the inner walls thereof. A tubular member 50 is capable of abutment upon the plate 34′ and has its other extremity 51 threaded to mesh with threads within the inner wall of the member 48. A tight joint is made between the walls of the conduits 44 and 46 and the testing member 48 by means of a member comprising an upper member 52 and a lower member 53, hinged at 54 and being capable of tight closure by means of the wing bolt 55. The interior faces 56, 56 of the members 52 and 53 are triangular in form and of such size, shape and material as to form a tight joint between the members 44, 46 and 48. Each conduit 44 carries a valve 57 and each conduit 46 carries a valve 58.

The annular flange 60 of the body 30 is attached to the hollow conical member 61 by the bolts 62, 62. The annular flange 35 of the body 30 is attached to the hollow conical member 63 by the bolts 64, 64. An imperforate conical member 65 is within the chamber 66 of the member 61, and a corresponding imperforate conical member 67 is within the chamber 68 of the member 63. Within the chambers 66 and 68, and extending radially from the members 65 and 67 to the walls 61 and 63 is a series of downwardly converging plates 69, 69.

The member 61 is connected to the pipe 70, carrying the valve 71 connected to the discharge chamber of the rotary pump 72. The receiving chamber of the pump 72 is connected to the pipe 73, carrying the valve 74, connected to the pipe 75, which, in turn, is connected to the pipe 76 which connects with the bottom of the reserve tank 77.

The member 63 is connected to the pipe 78, carrying the valve 79, connected to the discharge chamber of the rotary pump 80. The receiving chamber of the pump 80 is connected to the pipe 81, carrying the valve 82, which is connected to the pipe 75. The pipe 83, carrying the valve 84, connects the pipe 70 with the suction end of the reciprocating pump 85. The discharge end of the pump 85 is connected to the pipe 86, carrying the valve 87 connected to the pipe 88, which, in turn, is connected to the pipe 89, entering the upper portion of the chamber 47. A pipe 90, carrying the valve 91, connects pipe 88 with the top of the reserve tank 77.

The pipe 92, carrying the valve 93, connects the pipe 78 with the suction end of the reciprocating pump 94. The discharge end of the pump 94 is connected to the pipe 95, carrying the valve 96, connected to the pipe 97, which, in turn is connected to the pipe 98 entering the upper portion of the chamber 45. A pipe 99, carrying the valve 101, connects pipe 97 with the top of the reserve tank 77. A pair of wheels 102, connected with the member 63, and a pair of wheels 103, carrying the pump 80, are movable along and upon the tracks 104.

A pipe 105, carrying the valve 106, serves as a means for draining the device.

Pipe 107, carrying the valve 108 and pipe 109, carrying the valve 110, respectively connect the pipes 73 and 81 with a source of liquid or fresh water supply.

The foraminous plates 32 and 34 are similar and comprise a series of spaced parallel semi-cylindrical bars 110, 110, each carrying a series of teeth 111, 111, as shown in Figs. 12, 13 and 14.

The modified bars 112, shown in Figs. 15 and 16, are cylindrical in form.

The modified bars 113, shown in Figs. 17 and 18, are semi-cylindrical in form.

The modified bars, shown in Figs. 19 and 20, comprise a truncated cylindrical member 114, carrying a series of teeth 115.

The modified bars, shown in Figs. 10 and 11, comprise a cylindrical member 116, carrying a serrated plate 117.

The modified dyeing chamber portion of the device shown in Fig. 24, has a closed end 118, capable of attachment to the member 35 by means of the bolts 119, 119, instead of the hollow conical member 63 shown in Fig. 2.

The operation of the device is as follows, assuming it to be open and ready for loading:—

Each plate 32 is placed in position, a number of warp balls 100 is placed in each dyeing chamber 31. A plate 34 is placed in each dyeing chamber, the spider legs 42, 42 and the annular member 43 are placed within. The member 36 is then bolted in place and the bolts 40 screwed inwardly until the desired pressure is obtained upon the warp balls. The member 63 and the pump 80 with their connecting pipes, are rolled upon the track 104 and member 63 bolted to the flange member 35 by means of the bolts 64, 64. The parts of pipe 92 and the parts of pipe 81 are connected by means of the couplings 111 and 112. The testing device 48 is loaded with warp balls 100' proportionate to those in the large device and the device replaced.

All of the valves are closed with the exception of valves 110, 79, 101, 57 and 58 and the rotary pump 80 started. The liquid passes from a dissolving tank, not shown, through the pipes 109 and 81 into the pump 80 and thence is forced through the pipe 78, the member 63, through the foraminous plates 34, 34, the fiber 100, the foraminous plates 32, 32, the pipes 98, 97 and 99 into the reserve tank 77. When sufficient liquid has been introduced from the dissolving tank into the reserve tank 77, valve 110 is closed and valve 82 is opened, the liquid thus being continuously circulated in the direction mentioned above.

When it is desired to draw the liquid through the device, the pump 80 is stopped, valves 101, 82 and 79 are closed and valves 96 and 93 opened and the reciprocating pump 94 started. The liquid is now drawn through the plates 34, 34, the fiber 100, the plates 32, 32, the pipes 98 and 95 into the pump 94 and from there continuously supplied to the device through the pipes 92 and 78 and the member 63.

It is evident that a reverse force and pull of the liquid through the device may be accomplished by the rotary pump 72 and the reciprocating pump 85 by manipulating the valves corresponding to those described above.

During all of these operations the fiber 100' within the testing device receives the same treatment as that within the larger device. When it is desired to determine the condition of the fiber in the larger device, valves 57 and 58 are closed, the members 52, 53 opened, the testing device 48 removed, the fiber 100' examined and the testing device 48 replaced and the members 52, 53 closed and locked, and valves 57 and 58 opened.

The fiber may be washed by introducing fresh water through the pipe 109.

In the modification shown in Fig. 24, the device is operative from one end instead of from both ends as in the form of device illustrated in the other drawings. The liquid is forced by the pump 72 through the pipe 70, the chamber 45, the plates 32, 32, the fiber 100, 100, the plates 34, 34, the chamber 47 and the pipes 89, 88 and 90 into the reserve tank 77 and thence it passes through the pipes 76, 73 back to the pump for continuous circulation. The liquid is drawn in the opposite direction from the chamber 47, through the plates 34, 34, the fiber 100, 100, the plates 32, 32, the chamber 45, the pipes 70 and 83 into the reciprocating pump 85 and thence through the pipes 86, 88 and 89 back into the chamber 47 for continuous circulation.

The arrangement and size of the testing device is such as to allow a pressure of liquid upon the fiber contained therein equal to that upon the fiber contained in the larger device, the quantity of liquid being proportionate in the two devices.

I do not limit myself to the particular size, shape, number or arrangement of parts shown and described, all of which may be varied without going beyond the scope of my invention as described and claimed.

What I claim is:—

1. In a dyeing machine, in combination, a receptacle, a series of dyeing chambers within the receptacle, a foraminous plate forming one end of each dyeing chamber, a second foraminous plate forming the other end of each dyeing chamber, means for moving the plates with respect to each other and capable of compressing fiber between them, means for forcing a liquid in one direction through the device and fiber therein and means for drawing a liquid in the opposite direction through the device and fiber therein.

2. In a dyeing machine, in combination, a receptacle, a series of dyeing chambers within the receptacle, a foraminous plate forming one end of each dyeing chamber, a second foraminous plate slidable within each dyeing chamber and abutting upon the walls thereof, means for moving the second plate with respect to the first plate, maintaining it in a fixed position and capable of compressing fiber between the two plates, means for forcing a liquid in one direction through the foraminous plates and fiber therein and means for drawing a liquid in the reverse direction through the foraminous plates and fiber therein.

3. In a dyeing machine, in combination, a receptacle, a series of dyeing chambers with the receptacle, a foraminous plate forming one end of each dyeing chamber, a second foraminous plate slidable within each dyeing chamber and abutting upon the walls thereof, a spider abuttable upon each second foraminous plate, means whereby the spiders may be moved inwardly and capable of compressing fiber between the two plates, means for forcing a liquid in one direction through the device and fiber therein and means whereby a liquid may be drawn in the opposite direction through the device and fiber therein.

4. In a dyeing machine, in combination, a receptacle, a series of dyeing chambers within the receptacle, a foraminous plate comprising a series of spaced parallel bars forming one end of each chamber, a second foraminous plate comprising a series of spaced parallel bars slidable within each chamber and abutting upon the walls thereof, means for moving the second plate with respect to the first plate, maintaining it in position and capable of compressing fiber between the two plates, means for forcing a liquid in one direction through the device and fiber therein and means for drawing a liquid in an opposite direction through the device and fiber therein.

Signed at New York in the county of New York and State of New York this 4 day of March, 1918.

HOWARD M. DUDLEY.